(12) United States Patent
Papandrew et al.

(10) Patent No.: US 10,381,656 B2
(45) Date of Patent: Aug. 13, 2019

(54) NANOCOMPOSITE ELECTRODE MATERIAL FOR PROTON CONDUCTING FUEL CELL

(71) Applicant: University of Tennessee Research Foundation, Knoxville, TN (US)

(72) Inventors: Alexander B. Papandrew, Knoxville, TN (US); Ramez A. Elgammal, Knoxville, TN (US)

(73) Assignee: University of Tennessee Research Foundation, Knoxville, TN (US)

(*) Notice: Subject to any disclaimer, the term of this patent is extended or adjusted under 35 U.S.C. 154(b) by 758 days.

(21) Appl. No.: 14/946,031

(22) Filed: Nov. 19, 2015

(65) Prior Publication Data
US 2017/0149068 A1  May 25, 2017

(51) Int. Cl.
*H01M 4/92* (2006.01)
*H01M 4/86* (2006.01)
*H01M 8/1018* (2016.01)

(52) U.S. Cl.
CPC ........ *H01M 4/926* (2013.01); *H01M 4/8663* (2013.01); *H01M 4/8673* (2013.01); *H01M 4/92* (2013.01); *H01M 2008/1095* (2013.01)

(58) Field of Classification Search
None
See application file for complete search history.

(56) References Cited

U.S. PATENT DOCUMENTS

2016/0190547 A1* 6/2016 Schweiss ............... C01B 32/05
                                                            429/2

FOREIGN PATENT DOCUMENTS

WO   WO 2015/032667   *  3/2015

OTHER PUBLICATIONS

Dane A. Boysen, High-Performance Solid Acid Fuel Cells Through Humidity Stabilization, www.sciencemag.org, vol. 303, Jan. 2, 2004, pp. 68-70.
Calum R.I. Chisholm, From Laboratory Breakthrough to Technological Realization: The Development Path for Solid Acid Fuel Cells, The Electrochemical Society Interface, Fall 2009, pp. 53-59.
Sossina M. Haile, Solid Acids As Fuel Cell Electrolytes, Materials Science, California Institute of Technology, Pasadena, California 91125, Nature, vol. 410, Apr. 19, 2001, pp. 910-913.
Sossina M. Haile, Solid Acid Proton Conductors: From Laboratory Curiosities to Fuel Cell Electrolytes, Materials Science, California Institute of Technology, Pasadena, California 91125, www.rsc.org/faraday_d, Faraday Discussions, Aug. 7, 2006, pp. 17-39.
Alexander B. Papandrew, Advanced Electrodes for Solid Fuel Cells by Platinum Deposition on CSH2PO4, ACS Publications, Chemistry of Materials, Mar. 15, 2011, pp. 1659-1667.

(Continued)

*Primary Examiner* — Sarah A. Slifka
(74) *Attorney, Agent, or Firm* — Brooks Kushman P.C.

(57) ABSTRACT

An electrode includes a proton conducting electrolyte phase, an electronic conducting phase, and a metal or metal alloy catalyst in contact with each of the phases. The electronic conducting phase is infiltrated with the proton conducting electrolyte phase such that the phases form a solid nanocomposite with bulk electronic conductivity.

19 Claims, 4 Drawing Sheets

(56) References Cited

OTHER PUBLICATIONS

Alexander B. Papandrew, Activity and Evolution of Vapor Deposited Pt-Pd Oxygen Reduction Catalysts for Solid Acid Fuel Cells, Journal of the Electrochemical Society, 2013, vol. 160, Issue 2, pp. F175-F182.

Alexander B. Papandrew, Electrochemical Hydrogen Separation Via Solid Acid Membranes, Journal of the Electrochemical Society, 2014, vol. 161, Issue 5, pp. F1-F7.

Alexander B. Papandrew, Ruthenium as a CO-Tolerant Hydrogen Oxidation Catalyst for Solid Acid Fuel Cells, Journal of Materials Chemistry A, The Royal Society of Chemistry, 2015, pp. 3984-3987.

Ming et al., Steaming Multiwalled Carbon Nanotubes Via Acid Vapour for Controllable Nanoengineering and the Fabrication of Carbon Nanoflutes, Chem. Commun., 2011, 47, pp. 5223-5225.

Song et al., Ultrafine Porous Carbon Fiber and its Supported Platinum Catalyst for Enhancing Performance of Proton Exchange Membrane Fuel Cells, Electrochimica Acta 177, 2015, pp. 174-180.

\* cited by examiner

NANOCOMPOSITE ELECTRODE MATERIAL FOR PROTON CONDUCTING FUEL CELL

STATEMENT REGARDING FEDERALLY SPONSORED RESEARCH OR DEVELOPMENT

The invention was made with Government support under Contract No. DE-AR0000499 awarded by the Department of Energy. The Government has certain rights to the invention.

TECHNICAL FIELD

This disclosure relates to electrolytes for proton conducting fuel cells.

BACKGROUND

With reference to FIG. 1, a fuel cell 10 is an electrochemical device that uses chemical reactions to produce useful electricity directly, rather than through a stepwise conversion of chemical energy to mechanical energy or heat. Fuel cells are thus not bound by the Carnot efficiency limits for heat engines and can be significantly more efficient than technologies such as internal combustion.

The core of the fuel cell 10 includes a membrane-electrode assembly (MEA) 12, comprising an anode 14, electrolyte membrane 16, and cathode 18, forming a sandwich-like configuration. In a proton-conducting hydrogen-air fuel cell, hydrogen oxidation occurs at the anode 14, producing protons and electrons. The electrolyte membrane 16 is conductive only for protons, and so the electrons produced flow through an external load, doing useful work. At the cathode 18, oxygen is reduced and activated oxygen reacts with protons to form water. In the case of devices operating at temperatures above 100° C., the water produced is gaseous rather than liquid.

SUMMARY

A proton conducting fuel cell comprises an anode, a cathode, and a separator membrane between the anode and cathode. The cathode includes cesium dihydrogen phosphate particles having infiltrated therein carbon nanotubes configured to permit electron flow therethrough and having thereon a catalyst including platinum.

An electrode comprises a proton conducting electrolyte phase, an electronic conducting phase infiltrated with the proton conducting electrolyte phase such that the phases form a solid nanocomposite with bulk electronic conductivity, and a metal or metal alloy catalyst in contact with each of the phases.

A proton conducting fuel cell comprises a separator membrane. The proton conducting fuel cell also comprises an electrode, in contact with the separator membrane, that includes a proton conducting electrolyte phase having thereon a metal or metal alloy catalyst and infiltrated therein an electronic conducting phase such that the phases form a solid nanocomposite with bulk electronic conductivity.

DETAILED DESCRIPTION

Figure 1:
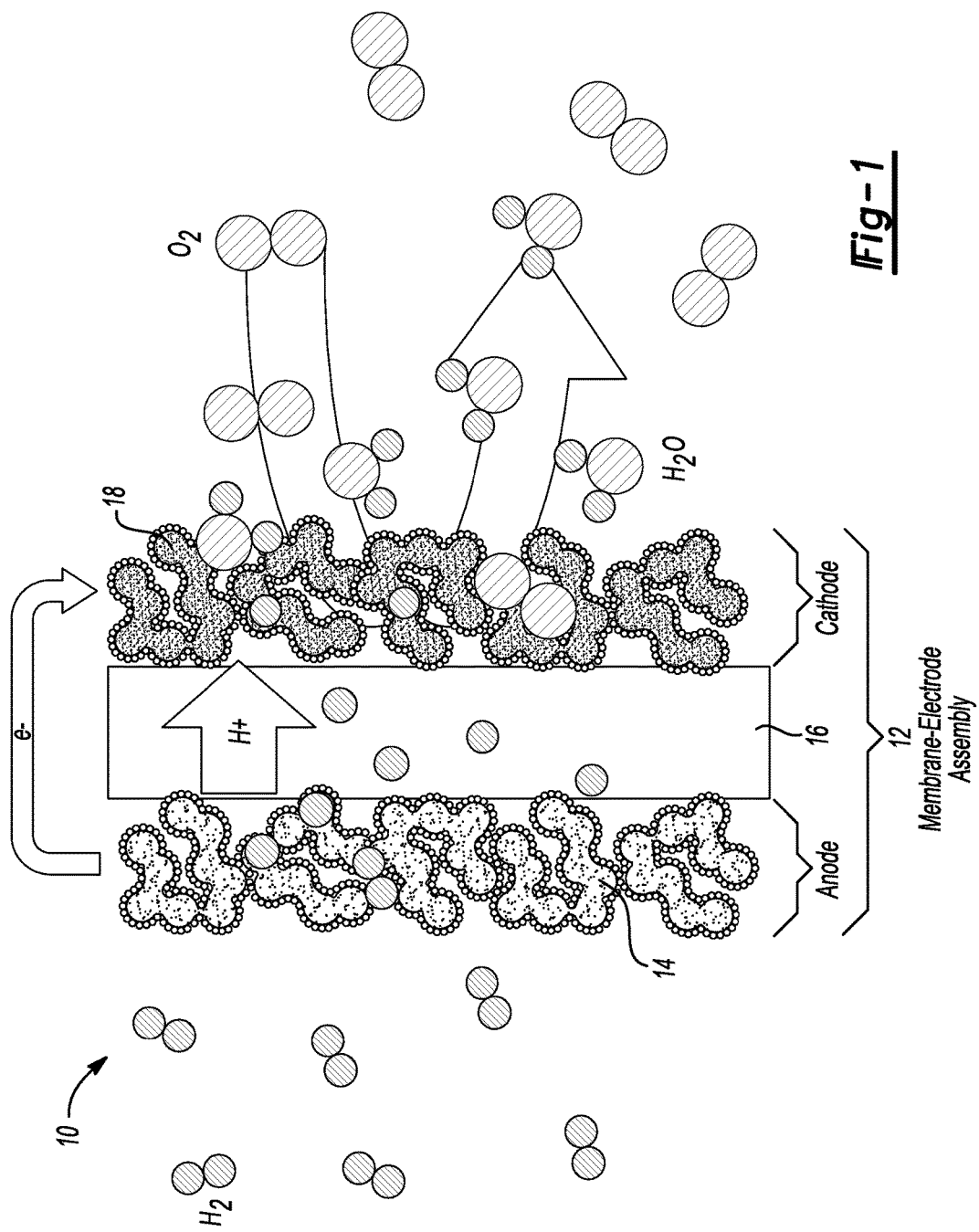
FIG. 1 is a schematic diagram of a proton-conducting fuel cell showing the anode, electrolyte membrane, and cathode.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Overview

Fuel cells including electrolytes based on phosphates such as cesium dihydrogen phosphate ($CsH_2PO_4$ or CDP) or neodymium phosphate ($NdPO_4$), combinations of phosphates with organic molecules such as azoles or guanidine, superprotonic solid acids such as cesium hydrogen sulfate ($CsHSO_4$) and CDP, pyrophosphates such as indium doped tin pyrophosphate, oxides such as strontium doped barium zirconate or strontium doped barium cerate, and polymers such as the greater class of perfluorinated sulfonic acid polymers, as well as those fuel cells including organic proton conducting solid electrolytes by way of 4,5-dicyanotriazole for example belong to the class of devices referred to as proton conducting solid electrolyte fuel cells. When cells of this type operate at temperatures above 230° C. in certain examples, they may be tolerant to high concentrations of carbon monoxide typically present in reformed hydrocarbon fuels. At an intermediate operational temperature (e.g., 100° C. to 300° C.), stack components and seals made of conventional materials are readily applicable.

A key impediment to the adoption of proton conducting solid electrolyte fuel cells, however, is cathode performance. In proton-conducting fuel cells, the electrochemical activity of the cathode depends on mutual access of protons, electrons, and molecular oxygen to a catalyst site. These sites are often referred to as tri-phase boundaries based on a schematic understanding that electrolyte, catalyst, and pore phases respectively deliver protons, electrons, and oxygen to allow the oxygen reduction reaction (ORR) to proceed. In most fuel cell technologies, this is an over-simplification and electrode components are multi-functional. In low-temperature polymer electrolyte membrane (PEM) systems, for example, the polymer component in the electrode has oxygen permeability that allows a large fraction of the platinum catalyst present to be active for the ORR. Similarly, high-temperature oxide systems may utilize a mixed ionic-electronic conducting electrode material to increase the available tri-phase area.

Solid acid fuel cells (SAFCs) are a subset of proton conducting solid electrolyte fuel cells based on superprotonic solid acid electrolytes. Typical SAFC electrodes are based on a porous framework of the, for example, CDP electrolyte functionalized with an interconnected film of platinum nanoparticles that serves as both the ORR catalyst and the electronic conductor. The tri-phase area, and hence the activity, of these electrodes scales with the surface area of the electrolyte in the electrode, and increasing the surface area of the electrolyte in the electrode improves performance. Additional surface area, however, requires additional platinum, which can be expensive.

Here, this problem is addressed by uncoupling the role of electrical conductivity in the cathode from the platinum metal catalyst. This goal is accomplished, for example, by forming a nanocomposite material that contains both a proton-conducting electrolyte and an electron-conducting carbon nanotube component mixed at the nanometer scale. Electrons produced by chemical reactions at tri-phase boundaries on the surface of the nanocomposite can now flow through the bulk of the nanocomposite, rather than only along its surface. This new architecture thus permits much lower precious metal loadings while maintaining performance.

In one example, a composite of CDP and carbon nanotubes is formed by addition of aqueous CDP to dry carbon nanotubes followed by slow crystallization. Vapor deposition is used to attach catalyst particles to the surface of the composite structure. This material may then be used to form a fuel cell electrode. Due to the conductive nanotubes in the core of the composite material, it conducts electrons. Therefore a continuous film of metal nanoparticles is not required. The resulting electrode can exhibit performance consistent with existing electrodes but with as little as 25% of the precious metal content.

Figure 2:
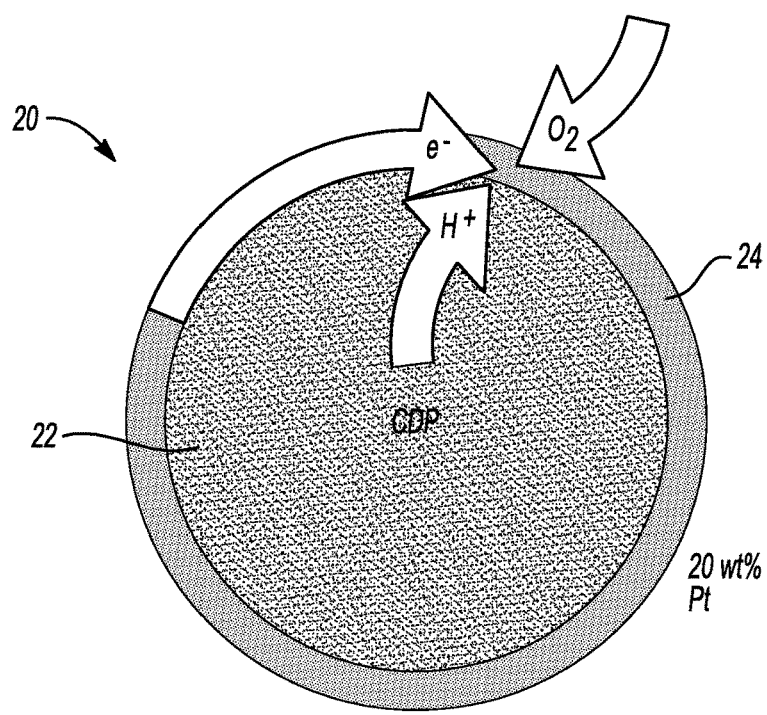
FIG. 2 is a schematic diagram of prior art solid acid fuel cell material. Electrons can only flow along the surface of the electrolyte particle through the platinum nanoparticle coating.
Figure 3:
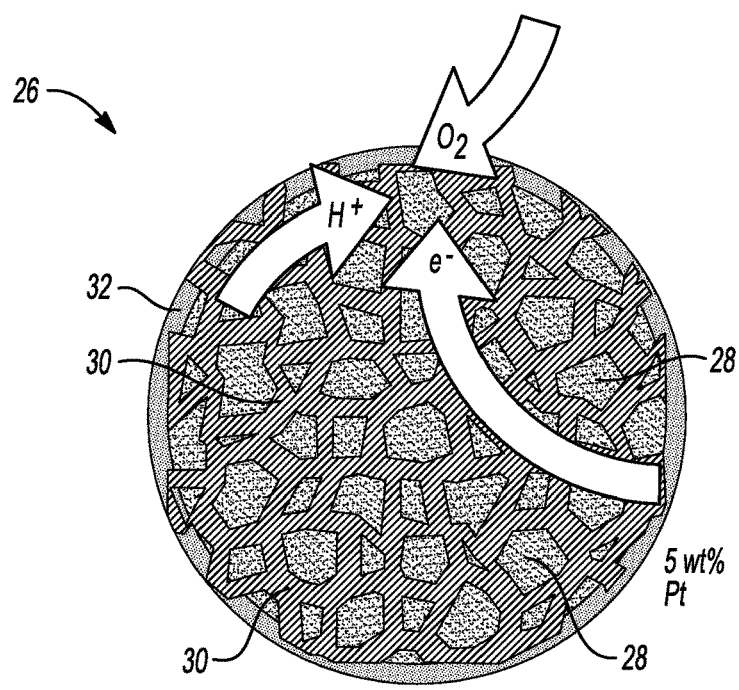
FIG. 3 is a schematic diagram of a solid acid fuel cell material. Electrons can flow through the bulk of the nanocomposite along carbon nanotubes embedded in the solid proton conductor.

FIG. 2 illustrates typical SAFC electrode material 20 including a CDP electrolyte 22 having a platinum nanoparticulate coating 24 thereon. As such, electrons can only flow along the surface of the electrolyte particle through the coating 24. FIG. 3, in contrast, illustrates an example advanced electrode material 26 including a proton conducting electrolyte phase 28 (e.g., CDP) having an electronic conducting phase 30 (e.g., carbon nanotubes) embedded within the electrolyte phase 28, and a metal (or metal alloy) catalyst 32 (e.g., platinum, platinum based alloys such as platinum-palladium or platinum-nickel, etc.) in contact with each of the phases 28, 30. Unlike the material 20 of FIG. 2, electrons can flow through the bulk of the nanocomposite along the electronic conducting phase 30 embedded in the electrolyte phase 28 as well as along the surface of the electrolyte particle through the catalyst 32. This material, for example, can be used within the context of the electrodes of FIG. 1.

As mentioned above, the proton conducting electrolyte phase can be a phosphate, a superprotonic solid acid, a pyrophosphate, an oxide, or a polymer. The proton conducting electrolyte phase can also be organic. The electronic conducting phase can be chemically functionalized or doped with heteroatoms such as boron, nitrogen or phosphorous. Moreover, the electronic conducting phase can be carbon nanotubes, mesoporous carbon, single-walled or multi-walled carbon nanohorns, or porous carbon fibers (that may be doped with heteroatoms). Other arrangements are also contemplated.

In proton-conducting fuel cells, the hydrogen oxidation reaction that occurs at the anode is typically much more facile than the oxygen reduction reaction occurring at the cathode. This permits lower catalyst content to be used in anodes adopting any of the arrangements contemplated herein, and also allows for platinum-free catalysts to be employed such as palladium or ruthenium. Ruthenium anode catalysts are especially useful in the case of fuel streams containing impurities such as carbon monoxide, since ruthenium is more tolerant of carbon monoxide than platinum.

EXPERIMENTAL

Preparation of Carbon Nanotubes 1 g of non-graphitized multi-walled carbon nanotubes (MWNTs) with nominal diameters of 10-20 nm were placed in a glass vessel having a porous frit as its base. This vessel was inserted into a polytetrafluoroethylene (PTFE) cup containing 3.3 mL of concentrated nitric acid. The PTFE cup was capped with a PTFE lid and sealed within a stainless steel autoclave. The autoclave was heated to 160° C. for four hours, causing the nitric acid to vaporize and react with the MWNTs. The autoclave was then cooled passively in air, after which the treated MWNTs were removed, washed with copious deionized water, and subsequently dried in air at 120° C.

Preparation of Infiltrated CDP-Carbon Nanotube Composite 100 mg of $HNO_3$-treated carbon nanotubes were added to a polypropylene centrifuge tube. To this tube was added 15 mL of aqueous CDP with a concentration of 0.1 $g \cdot mL^{-1}$. The contents of the tube were briefly vortex-mixed and then immediately decanted into a PTFE evaporating dish. The dish was left to dry undisturbed in air for approximately 96 hours. Upon observing that the dish contents were dry by visual inspection, the dish was transferred to an oven and dried at 120° C. for 15 minutes. The resulting dry cake was briefly ground using an agate mortar and pestle. The resultant powder was transferred to a glass jar containing 80 g of yttria-stabilized zirconia (YSZ) spherical milling media with 2 mm diameter. HPLC-grade methanol was added to barely cover the solids in the jar. The jar was securely capped and milled by low-speed tumbling for 24 hours. Following the milling treatment, the resulting CDP-carbon nanotube-methanol slurry was separated from the YSZ milling media using a transfer pipette. Copious toluene was added to this slurry, followed by boiling of all liquids in an oven at 130° C. After several hours at 130° C., a uniform dark-gray powder was recovered.

Preparation of SAFC Cathode

The 15:1 CDP:carbon nanotube composite can be activated by platinum (Pt) catalyst attachment either via chemical vapor deposition (CVD) or physical vapor deposition (PVD). In the case of CVD, the 15:1 composite is mixed with the appropriate quantity of solid Pt(acac)$_2$ and heated to 210° C. in a $N_2$—$H_2O$ atmosphere as described previously. Pt PVD is performed in vacuum using sputtering and a sample agitation system to fluidize the powdered composite. In each case, a Pt content of 5 wt % of the composite was obtained. The Pt-loaded composite is then laminated to the CDP electrolyte membrane at 8 MPa. Typically 40 mg of 5 wt % Pt composite is used for a 2.85 cm$^2$ cell area, resulting in an areal Pt loading of 0.7 mg·cm$^{-2}$. Materials were also prepared with lower Pt content of 2.5 wt % Pt, yielding an areal Pt loading of 0.35 mg·cm$^{-2}$ for a 40 mg cathode. Other configurations are also contemplated.

Fuel Cell Testing

Fuel cell testing was conducted at 250° C. with gases hydrated to a dew point of 75° C. (approximately 0.35 bar water partial pressure). Anodes were supplied ultrahigh-purity $H_2$ and cathodes were supplied ultrahigh-purity air. Polarization curves were recorded with a Bio-Logic VSP potentiostat by scanning the working electrode potential at 5 mV·s$^{-1}$ from the open circuit potential to 0 V cell potential. The high-frequency intercept of the electrochemical impedance spectroscopy (EIS) spectrum was used to eliminate the ohmic resistance of the CDP membrane from the polarization curves, yielding what is hereafter referred to as iR$_\Omega$-free polarization curves.

Figure 4:
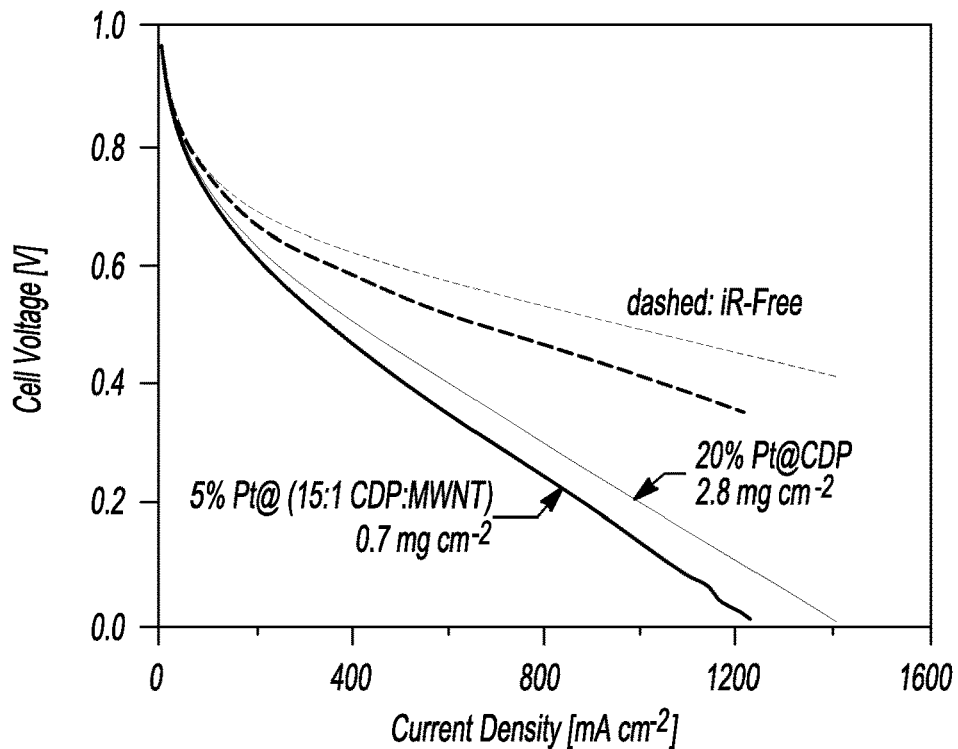
FIG. 4 shows plots of raw and $iR_\Omega$-free polarization curves for solid acid fuel cells with a typical cathode (20% Pt@CDP, 2.8 mg·cm$^{-2}$) and an advanced cathode (5% Pt@(15:1 CDP:MWNT), 0.7 mg·cm$^{-2}$) acquired at 250° C. and 75° C. dew point in $H_2$-air. The advanced cathode has nearly the same performance as the typical cathode but with 25% of the platinum content.

Polarization curves for the advanced cathodes in comparison with a typical cathode are shown in FIG. 4. The performance for the advanced cathode (5% Pt@(15:1 CDP:MWNT), 0.7 mg·cm$^{-2}$) is nearly identical to that of the typical cathode (20% Pt@CDP, 2.8 mg·cm$^{-2}$) at high cell voltages, i.e., high efficiency. Both cells produce approximately 60 mA·cm$^{-2}$ at 70% electrical efficiency (0.78 V cell potential). The example experimental electrode displays significantly greater utilization of Pt, which is quantified by mass-normalized activity at 70% electrical efficiency using units of mA·mg$_{Pt}^{-1}$. Here we find a value of 85 mA·mg$_{Pt}^{-1}$ for the advanced formulation versus 21 mA·mg$_{Pt}^{-1}$ at 0.78 V for a typical cathode. The advanced electrode deviates from the standard cell performance at higher currents, which may be attributable to a slightly lower proton conductivity in the nanocomposite due to the volume fraction occupied by electron-conducting material.

Figure 5A:
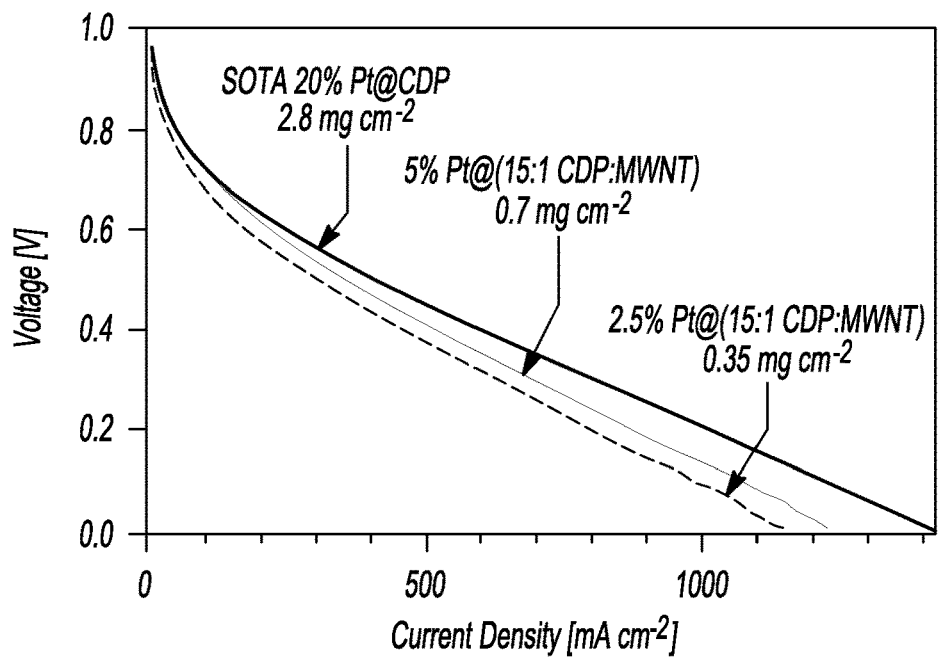
FIG. 5A shows plots of raw polarization curves for solid acid fuel cells with a typical cathode (20% Pt@CDP, 2.8 mg·cm$^{-2}$) and advanced cathodes at 0.7 mg·cm$^{-2}$ and 0.35 mg·cm$^{-2}$ acquired at 250° C. and 75° C. dew point in $H_2$-air.
Figure 5B:
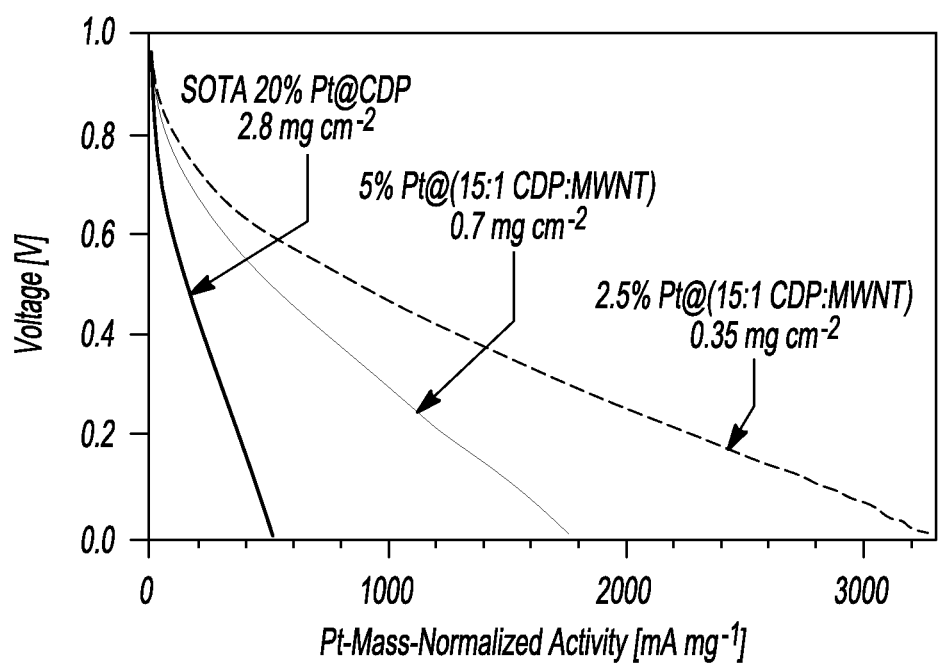
FIG. 5B shows plots of platinum-mass-normalized activity for the polarization curves of FIG. 5A.

Lower Pt loadings were also evaluated by vapor-depositing lower amounts of Pt on 15:1 CDP:MWNT nanocomposites. Reducing the Pt content of the cathode material to 2.5% while using the same cathode mass (40 mg) yields an areal Pt loading of 0.35 mg·cm$^{-2}$. The performance of this cathode is compared to that of a typical cathode and the advanced 5 wt % cathode in FIGS. 5A and 5B. Nanocomposite cathodes at a loading of 0.35 mg·cm$^{-2}$ attain approximately 65% of the current density of the typical electrode and the similar nanocomposite electrode at 0.7 mg·cm$^{-2}$ at 0.78 V. However in terms of mass-normalized activity, the cathode with the lowest loading is superior. This is in stark contrast to a typical cathode with 2.5 wt % Pt, which would have much higher ohmic resistance and much lower Pt-mass-normalized activity due to its discontinuous electronic conduction network.

CONCLUSIONS

Nanocomposite electrode materials can be formed, for example, by infiltration of aqueous CDP into dry MWNT bundles, followed by platinum attachment via vapor deposition. Such electrodes can be as active as current SAFC cathodes yet contain only 25% of the platinum content. Even lower platinum loadings are possible in this architecture, enabling a platinum-mass-specific activity of nearly 120 mA·mg$_{PT}^{-1}$ to be obtained at 0.78 V.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electrode comprising:
   a proton conducting electrolyte phase;
   an electronic conducting phase having pores thereon and interior diameter regions therein both infiltrated with the proton conducting electrolyte phase such that the phases form a solid nanocomposite with bulk electronic conductivity; and
   a metal or metal alloy catalyst in contact with each of the phases.

2. The electrode of claim 1, wherein the proton conducting electrolyte phase is a phosphate.

3. The electrode of claim 1, wherein the proton conducting electrolyte phase is a superprotonic solid acid.

4. The electrode of claim 1, wherein the proton conducting electrolyte phase is a pyrophosphate.

5. The electrode of claim 1, wherein the proton conducting electrolyte phase is an oxide.

6. The electrode of claim 1, wherein the proton conducting electrolyte phase is a polymer.

7. The electrode of claim 1, wherein the proton conducting electrolyte phase is organic.

8. The electrode of claim 1, wherein the electronic conducting phase is chemically functionalized.

9. The electrode of claim 1, wherein the electronic conducting phase is doped with heteroatoms.

10. The electrode of claim 6, wherein the heteroatoms include boron, nitrogen or phosphorous.

11. The electrode of claim 1, wherein the electronic conducting phase is carbon nanotubes.

12. The electrode of claim 1, wherein the electronic conducting phase is mesoporous carbon.

13. The electrode of claim 1, wherein the electronic conducting phase is single-walled or multi-walled carbon nanohorn.

14. The electrode of claim 1, wherein the electronic conducting phase is porous carbon fibers.

15. The electrode of claim 14, wherein the porous carbon fibers are doped with heteroatoms.

16. The electrode of claim 1, wherein the metal or metal alloy catalyst includes platinum.

17. A proton conducting fuel cell comprising:
a separator membrane; and
an electrode in contact with the separator membrane, and including an electronic conducting phase having pores thereon and interior diameter regions therein, a proton conducting electrolyte phase infiltrated within the pores and interior diameter regions, and a metal or metal alloy catalyst in contact with the phases to form a solid nanocomposite with bulk electronic conductivity.

18. The proton conducting fuel cell of claim 17, wherein the electrode is an anode.

19. The proton conducting fuel cell of claim 18, wherein the catalyst includes palladium or ruthenium.

\* \* \* \* \*

UNITED STATES PATENT AND TRADEMARK OFFICE
CERTIFICATE OF CORRECTION

PATENT NO. : 10,381,656 B2
APPLICATION NO. : 14/946031
DATED : August 13, 2019
INVENTOR(S) : Alexander B. Papandrew et al.

Page 1 of 1

It is certified that error appears in the above-identified patent and that said Letters Patent is hereby corrected as shown below:

In the Claims

Column 6, Line 53, Claim 10:
After "The electrode of claim"
Delete "6" and
Insert -- 9 --.

Signed and Sealed this
Eighteenth Day of February, 2020

Andrei Iancu
*Director of the United States Patent and Trademark Office*